US007890626B1

(12) United States Patent  
Gadir

(10) Patent No.: US 7,890,626 B1  
(45) Date of Patent: Feb. 15, 2011

(54) HIGH AVAILABILITY CLUSTER SERVER FOR ENTERPRISE DATA MANAGEMENT

(76) Inventor: Omar M. A. Gadir, 1529 Grackle Way, Sunnyvale, CA (US) 94087

( * ) Notice: Subject to any disclaimer, the term of this patent is extended or adjusted under 35 U.S.C. 154(b) by 168 days.

(21) Appl. No.: 12/283,586

(22) Filed: Sep. 11, 2008

(51) Int. Cl.
G06F 15/16 (2006.01)
G06F 15/173 (2006.01)
G06F 15/177 (2006.01)

(52) U.S. Cl. .................. 709/224; 709/223; 709/227; 709/249

(58) Field of Classification Search .......... 9/217–228, 9/246
See application file for complete search history.

(56) References Cited

U.S. PATENT DOCUMENTS

| | | | |
|---|---|---|---|
| 5,379,423 | A | 1/1995 | Mutoh et al. |
| 5,923,854 | A | 7/1999 | Bell et al. |
| 6,108,300 | A | 8/2000 | Coile et al. |
| 6,571,257 | B1 | 5/2003 | Duggan et al. |
| 6,665,304 | B2 | 12/2003 | Beck et al. |
| 6,718,383 | B1 | 4/2004 | Hebert |
| 6,738,760 | B1 | 5/2004 | Krachman |
| 6,944,785 | B2 * | 9/2005 | Gadir et al. ............... 714/4 |
| 7,007,048 | B1 | 2/2006 | Murray et al. |
| 7,080,378 | B1 | 7/2006 | Noland et al. |
| 7,213,065 | B2 * | 5/2007 | Watt ......................... 709/223 |
| 7,379,990 | B2 * | 5/2008 | Tsao ......................... 709/223 |
| 7,506,073 | B2 * | 3/2009 | Kuik et al. ................ 709/249 |
| 7,516,285 | B1 * | 4/2009 | Haynes et al. ............. 711/162 |
| 7,522,616 | B2 * | 4/2009 | Thompson ................. 370/401 |
| 2003/0018927 | A1 * | 1/2003 | Gadir et al. ............... 714/4 |
| 2004/0215749 | A1 * | 10/2004 | Tsao ......................... 709/220 |
| 2006/0004847 | A1 | 1/2006 | Claudatos et al. |
| 2006/0031357 | A1 | 2/2006 | Misra et al. |
| 2006/0241991 | A1 | 10/2006 | Pudhukottai et al. |
| 2006/0271457 | A1 | 11/2006 | Romain et al. |
| 2007/0011100 | A1 | 1/2007 | Libin et al. |
| 2007/0061441 | A1 * | 3/2007 | Landis et al. ............... 709/224 |
| 2007/0067435 | A1 * | 3/2007 | Landis et al. ............... 709/224 |
| 2007/0078988 | A1 * | 4/2007 | Miloushev et al. ......... 709/227 |
| 2007/0198612 | A1 | 8/2007 | Prahlad et al. |
| 2007/0250608 | A1 * | 10/2007 | Watt ........................ 709/222 |
| 2009/0100163 | A1 * | 4/2009 | Tsao ......................... 709/223 |
| 2009/0144416 | A1 * | 6/2009 | Chatley et al. ............. 709/224 |
| 2009/0144422 | A1 * | 6/2009 | Chatley et al. ............. 709/226 |

* cited by examiner

Primary Examiner—Haresh N Patel

(57) ABSTRACT

A high availability, scalable cluster server system for enterprise data management. The server is a cluster of two or more nodes. Each node runs one or more virtual servers. A virtual server consists of network resources and resources for enterprise data management. Failover is based on moving virtual servers from a failed node to a healthy node. The invention provides for network failover within the same node. Enterprise data management consists of data discovery, data categorization and applying enterprise policies on categorized data. One of the problems of data management is the diversity of policies and in some cases their conflicting requirements. According to one aspect of the invention, enterprise policies are broking into policy entities. Policy entities represent the simplest policy unit. Some of the policy entities are shared between the diversified enterprise policies. Identifying a data management policy with the highest priority and applying the policy entity that belongs to it resolve conflict in policy requirements.

3 Claims, 10 Drawing Sheets

1- A virtual IP address.
2- A physical IP address to which the Virtual IP address is attached.
3- Physical IP addresses the virtual server can failover to.
4- Categorization rules.
5- Search operations.
6- Access to data sources managed by the virtual server.
7- Access to index data repositories on the local and other nodes.
8- Access to metadata repositories on the local and other nodes.
9- Access to the cluster database.
10- Categorization operations.
11- Creation and execution of policies.
12- Scheduled data management jobs.

FIG. 6

| Generic Policy Entities | Policy Actions |
|---|---|
| data access | (1) allow data access. (2) deny data access |
| read permission | (1) allow read (2) deny read |
| write permission | (1) allow write (2) deny write |
| data retention | (1) retain until a specific date (2) retain for a period of time |
| data deletion | (1) delete a file or a record (2) wiping/shredding a file or a record |
| encryption | (1) encrypt with AES (2) encrypt with Twofish (3) encrypt with Blowfish (4) encrypt with Serpent |
| SSN | (1) send security alert (2) deny access (3) delete after archiving (4) move data to a secure store (5) remove data (6) apply company's policy |
| credit card number | (1) send security alert (2) deny access (3) delete after archiving (4) move data to a secure store (5) remove data (6) apply company's policy |
| bank account | (1) send security alert (2) deny access (3) delete after archiving (4) move data to a secure store (5) remove data (6) apply company's policy |
| audit | (1) audit access, modification, deletion, change owner, change permissions and creation date (2) additional regulatory compliance auditing (3) audit archive policy (when a document was archived, who archived it, document restoration date and who restored it |
| WORM | (1) deny write and deny modifications to metadata and schema |
| delete stale files | (1) delete |
| delete duplicate files | (1) delete |
| delete contraband files | (1) delete |
| lock and isolate | (1) store data in a secure place or in an archive |
| replicate | (1) replicate in one place (2) replicate in different places |

FIG. 8

HIGH AVAILABILITY CLUSTER SERVER FOR ENTERPRISE DATA MANAGEMENT

BACKGROUND OF THE INVENTION

The invention relates to a high availability and scalable cluster server for enterprise data management.

High availability cluster server is a server that continues to function even after a failure of system hardware or software. The usual way of providing high availability is to duplicate system components. If some component becomes unavailable, another can be used instead. Scalable cluster server is a server that is able to increase performance and workload by adding more hardware or software resources.

A cluster is a group of servers and other resources that act like a single system and enable high availability and load balancing. The servers are referred to as nodes. Nodes typically consist of one or more instruction processors (generally referred to as CPUs), disks, memory, power supplies, motherboards, expansion slots, and interface boards. In a master-slave design, one node of the system cluster is called the primary or master server and the others are called the secondary, or slave servers. The primary and secondary nodes have similar hardware, run the same operating system, have the same patches installed, support the same binary executables, and have identical or very similar configuration. The primary and secondary nodes are connected to the same networks, through which they communicate with each other and with devices connected to the network. Both kinds of nodes run compatible versions of software. Some high availability systems support virtual network interfaces, where more than one IP (Internet Protocol) address is assigned to the same physical port. Services are associated with the virtual network interface and computing resources needed to perform the services. The virtual IP address does not connect a client with a particular physical server; it connects the client with a particular service running on a particular physical server.

In some cases, disks are directly attached to a node. This is referred to as Direct Attached Storage (DAS). In other cases, Storage Area Network (SAN), which is a high-speed special purpose network or sub-network interconnects different storage devices with the nodes.

Enterprise data management is the development and execution of policies, practices and procedures that properly manage enterprise data. Some aspects of data management are: security and risk management, legal discovery, Storage Resource Management (SRM), information lifecycle management (ILM) and content-based archiving. In addition, some companies have their own internal management policies. Another aspect of data management is data auditing. Data auditing allows enterprises to validate compliance with federal regulations and insures that data management objectives are being met. One of the challenges for data management products is to provide solutions to different aspects of data management in one platform. This is due to the various, and sometimes conflicting, requirements of different aspects of enterprise data management.

Security and risk management is concerned with discovery of sensitive data like Social Security number (SSN), credit card number, banking information, tax information and anything that can be used to facilitate identity theft. It is also concerned with enforcement of corporate policies for protection of confidential data, protection of data that contains customer phrases and numeric patterns and compliance with federal regulations. Some of the federal regulations that are related to security and risk management are: FRCP (Federal Rules of Civil Procedure), NPI (Non-Public Information) regulation, PII (Personally Identifiable Information) regulation, FERPA (Family Educational Rights and Privacy Act), GLBA (Gramm-Leach-Bliley Act), HIPAA (Health Insurance Portability and Accountability Act), SOX (Sarbanes-Oxley Act) and the U.S. Securities and Exchange Commission's (SEC's) Regulation.

Legal discovery refers to any process in which data is sought, located, secured, and searched with the intent of using it as evidence in a civil or criminal legal case. Legal discovery, when applied to electronic data is called e-Discovery. E-Discovery involves electronic evidence protection, legal hold, and chain of custody. A legal hold, sometimes referred to as litigation hold, is a process, which an organization uses to preserve all forms of relevant information when litigation is reasonably anticipated. Chain of custody logs and documents how the data was gathered, analyzed, and preserved. Federal regulations details what, how and when electronic data must be produced, including production as part of the pre-trial process.

SRM is the process of optimizing the efficiency and speed with which the available storage space is utilized. Among many things, it involves: removing duplicate, contraband and undesirable files, data retention and deletion, moving or removing files based on metadata and content and automated file migration through integrated storage tiering. Tiered storage is the assignment of different categories of data to different types of storage media in order to reduce total storage cost ILM is a sustainable storage strategy that balances the cost of storing and managing information with its business value. It provides a practical methodology for aligning storage costs with business priorities. ILM has similar objectives to SRM and is considered an extension of SRM.

Content-based archiving identifies files to be archived based on business value or regulatory requirements. It enables policy driven and automated file migration to archives based on file metadata and content, enables intelligent file retrieval, and it locks and isolates files in a permanent archive when that is required by federal regulations.

There are inter-dependencies between some components of enterprise data management. In some cases, the components share the same requirements. In other cases they have conflicting requirements. For instance SRM policy may decide that a category of data should be deleted, as it has not been accessed for a long time. At the same time legal discovery may decide to impose litigation hold on the same data because of its relevance to litigation.

One of the challenges to data management is the exponential growth of the enterprise data. Now, many companies have more than 1 petabyte of stored data. Another challenge is diversity of devices where data exists. Data exists in file servers, email servers, portals, web sites, databases, archives, and in other applications. Another problem domain is the proliferation of data into the fringes of the enterprise network, namely laptops and remote users.

Data management is based on data classification, sometimes referred to as categorization. Categorization of data is based on metadata or full text search. Categorization rules specify how data is classified into different groups. For instance, documents categorization could be based on who owns them, their size and their content. Metadata consist of information that characterizes data. Sometimes it is referred to as "data about data". Data categorization methods, based on metadata, group data according to information extracted from its metadata. A few examples of such information are: the time a document was last accessed, its owner, its type and its size. There are many methods for accessing and extracting information from metadata. Some methods utilize file system utilities. File system utilities can only extract file system attributes. Document parsers, sometimes called filters, are used for extracting metadata from documents, such as Microsoft Word, Microsoft PowerPoint and PDF files. The three top commercial parsers being used now are: Stellent, KeyView and iFitler. Some software developers write their own parsers or use open source parsers such as Apache POI. Classification based on full text utilizes search technology. Full text search is used to identify documents that contain specific terms, phrases or combination of both. The result of the search is used to categorize data. One of the widely used open source search engines is Lucene.

In addition to categorization, data management involves formulation of policies to be applied to classified data. For example, policies could be encrypting sensitive data, auditing data, retaining data, archiving data deleting data, modifying data access and modifying read and write permissions. Different policies could be grouped to form a top-level enterprise-wide policy or a departmental policy.

Part of data management is creation of data management reports. Reports could cover storage utilization, data integrity, duplicated data and results of executing compliance and internal policies. In some implementations, classification rules, policies, results of data analysis and report definition files are stored in a database. Report definition files contain instructions that describe report layout for the reports generated from the database.

Enterprise data is stored in different devices dispersed across the network. To perform data analysis, one can manually enter the location of the data, which is daunting when many devices are connected to the network. Alternatively, one can use methods or a combination of methods for automated data discovery. Some methods utilize Internet Protocol (IP) port scanners like nmap and Advanced IP Scanner. IP scanners determine services, devices available in the network and the type of data source. Then, a crawler is used to retrieve data. The type of crawler used depends on data source accessible through a network port. If the data source is a network file server, file system crawlers are used to recursively scan the directory structure of the file system and retrieve files. If the data source is a database, then database crawlers that utilize JDBC or LDBC are used. JDBC stands for Java Database Connectivity. LDBC stands for Liberty Database Connectivity. If the data source is an email server, crawlers that use Messaging Application Programming Interface (MAPI) or connectors are used. MAPI is a Microsoft interface for components that connect to Microsoft exchange. An example of an email connector is Novell's Connector for Microsoft Exchange. Some enterprise data is stored in corporate web portals (corporate intranets). Web crawlers are used to automatically traverse a corporate intranet by retrieving a document, and recursively retrieving all documents that are referenced. Web crawlers are also called spiders or web robots. Crawlers for archives depend on the type of the archive. For instance, crawlers for Network Data Management Protocol (NDMP) compatible archives utilize NDMP based crawlers. NDMP is an open standard protocol for enterprise-wide backup of heterogeneous network-attached storage. Some software vendors provide interface modules to help in writing connectors to their archives.

SUMMARY OF THE INVENTION

In general, in one aspect, the invention provides high availability and scalable cluster server systems for enterprise data management. Each system is a cluster of two or more autonomous servers, called nodes or physical servers, and computer program products and methods for operating such systems. One of the nodes in the cluster server is the master and the rest are the slaves. Each node runs one or more virtual servers. The nodes are connected to the same networks, through which they communicate with each other and with devices where enterprise data is stored. The invention provides systems, programs, and methods for discovery of data stored in devices connected to the network and management of that data by creating categorization rules and management policies. Discovery uses network scanners and crawlers to identify the data source and retrieve data. Data discovered includes, but not limited to, network file systems, email servers, databases, intranets, and data archives.

Categorization is based on metadata extraction and analysis and full text search. Metadata analysis methods include, but not limited to, file system utilities and document parsers. Each node stores extracted metadata and result of metadata analysis in a metadata repository accessible to other nodes. Search engines are used to perform full text search. Each node stores; search index in a repository accessible to other nodes. Categorization rules are applied to enterprise data to categorize it into different categories. Management policies are applied to each category. The invention provides methods to develop company's internal policies and policies to ensure regularity compliance.

Results of data management and report definitions are stored in a database in the master node. Data stored in the database also includes, but not limited to, categorization rules, policies, and report definition files.

Methods in the cluster create policy entities that represent the simplest policy unit. Each unit defines an action or a set of actions to be performed on data. Policy entities are combined to form policy groups. Policy entities could exclusively be owned by a policy group, or they could be shared between different groups. A policy group could represent an internal policy or a regulatory compliance policy. Policy entities shared between two or more policy groups may have different or conflicting actions. The invention provides methods for resolving the conflicts. When there is a conflict, higher priority is given to a shared policy entity that belongs to a regulatory compliance group. When two policy entities that are part of two different policy groups have different periods of enforcement, the entity with the longer period has a higher priority.

Each node runs one or more virtual servers. A virtual server consists of network resources and resources for data management. Each virtual server owns data discovery and data management tasks and one or more virtual IP addresses. Virtual servers are managed as separate entities and they share physical resources on a physical server.

When one of the nodes fails, its virtual servers are transparently transferred to one or more other nodes. This is achieved by providing a seamless connectivity between the nodes and the data sources. The connectivity between the data sources and the nodes is based on virtual IP technology. Nodes communicate with each other through a heartbeat network to determine the health of each other. The heartbeat can operate over an IP network infrastructure, to determine the availability of nodes. If one of the nodes or one of its components fails so that a virtual server running in that node goes down, failover occurs.

In a failover, the virtual sever of the failed node is migrated to another node. Under certain failure conditions, the seamless connectivity and redundant hardware and software components allow access to the data sources to be maintained without invocation of the failover process. Load balancing can be provided by distributing virtual servers from a failed node to multiple different nodes.

Node failover is disruptive and after failover, the number of healthy nodes within a cluster decreases, which may impact performance of the cluster. For this reason, node failover is made the last resort by providing network failover and application recovery within a node. Node failover takes place only after all network ports in a node had failed or when an application had failed and attempts to restart it are not successful.

In general, in another aspect, the invention provides systems, programs, and methods where the loading of nodes is monitored so as to identify nodes that are less loaded than others. This information is used to perform load balancing. After failover, virtual servers are migrated to nodes that are less loaded in preference to nodes that are more heavily loaded. Because nodes can support multiple virtual servers, load balancing can be performed in this way during normal operation as well, even in the absence of a failure.

Within the same node, load balancing across the network ports could be achieved by redistributing virtual interfaces across different healthy network ports. Software monitors the load on different ports belonging to a node. If a port is handling much more network traffic than other ports, some of its virtual interfaces are moved to ports which are less loaded.

In general, in another aspect, the invention provides systems, programs, and methods where, to minimize occurrence of failover, each node has multiple network ports. If one of the ports fails, services are moved to one of the surviving ports. This allows multiple network port failures to occur without invocation of node failover, so that node failover occurs only when there is no surviving port.

In general, in another aspect, to minimize occurrence of failover, the invention provides methods to restart an application if it failed. For this to happen, an application has to register with a software watchdog. The software watchdog monitors a registered application at regular intervals. If the application died the watchdog restarts it.

Implementations of the invention can realize one or more of the following advantages. Failover used only as a last resort, and consequently the disruption caused by failover to the accessibility of services is limited. Total system performance is improved through load balancing.

In general, in another aspect, the invention provides systems, programs, and methods that allow replicating metadata and search index repositories belonging to one node into another node or nodes. This provides redundant repositories. In case the node that owns the repository failed, its virtual servers are migrated to where the repositories are replicated. The master makes sure that the workload of the nodes that contain the replicated repositories is not high to ensure that they can handled extra work when virtual servers are migrated to them during failover. This alleviates the problem of re-creating the metadata and the search index of the failed node after failover.

In general, in another aspect, the invention provides systems, programs, and methods that allow binding of applications to specific CPUs, referred to as processors, in multiprocessor nodes. Binding an application to a processor ensures that the application is run on the same processor, which increases performance. The first step is to find the number of processors in a node. The number of applications running on different processors depends on the number of processors. Processors that do not participate in binding are available for other applications.

In general, in another aspect, the invention provides systems, programs, and methods for expanding the storage in nodes by adding more drives. This enables the system to allocate more storage for the search index and the metadata repositories and the local database where the results of data management are stored. As a consequence the cluster can manage larger amount of enterprise data.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIG. 6 is a list of resources owned by a virtual server.

FIG. 8 provides lists of generic policy entities and corresponding policy actions.

Like reference symbols in the various drawings indicate like elements.

DETAILED DESCRIPTION

Figure 1:
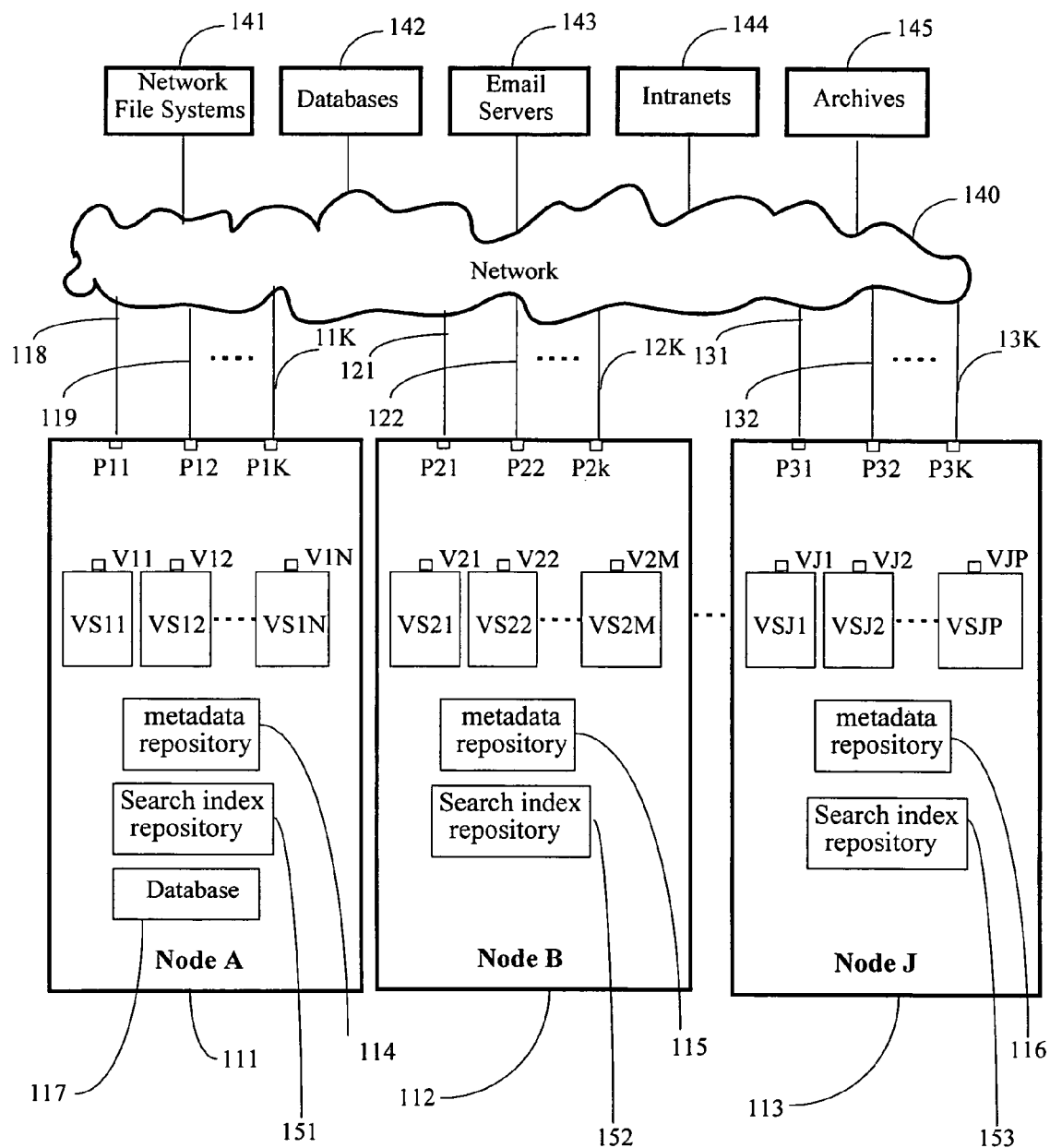
FIG. 1 is a block diagram of a high availability cluster server for enterprise data management according to one aspect of the present invention.

FIG. 1 illustrates the components of a high availability cluster server for enterprise data management in accordance with the invention.

The server has a cluster of nodes, Node A labeled 111, Node B labeled 112, . . . , Node J labeled 113. Each node has direct attached storage (DAS). Each node has one or more virtual servers. Node A has N virtual servers labeled VS11, VS12, . . . , VS1N. Node B has M virtual servers labeled VS21 VS22, . . . , VS2M. Node J has P virtual servers labeled VSJ1, VSJ2, VSJP. Virtual server VS11 has a virtual IP address V11, virtual server VS12 has a virtual IP address V12, . . . , virtual server VS1N has a virtual IP address V1N. Virtual server VS21 has a virtual IP address V21, virtual server VS22 has a virtual IP address V22, . . . , virtual server VS2M has a virtual IP address V2M. Virtual server VSJ1 has a virtual IP address VJ1, virtual server VSJ2 has a virtual IP address VJ2, . . . , virtual server VSJP has a virtual IP address VJP. Each node has K links to network 140. Node 111 is attached to the network by links 118, 119, . . . , 11K. Node 112 is attached to the network by links 121, 122, . . . , 12K. Node 113 is attached to the network by links 131, 132, . . . , 13K. Node 111 is the master node and contains database 117. Each node contains its own metadata repository and its own search index repository. Node 111 contains metadata repository 114, and search index repository 151. Node 112 contains metadata repository 115, and search index repository 152. Node 113 contains metadata repository 116 and search index repository 153. Network 140 connects the nodes to data sources. The data sources are network file systems 141, databases 142, email servers 143, Intranets 144 and data archives 145.

Each node runs one or more virtual servers. A virtual server consists of network resources and resources for data management. Virtual servers own virtual IP addresses and methods for data discovery and data management. They are managed as separate entities and they share physical resources on a physical server. Since all physical servers have similar physical resources, a virtual server can manage data on any physical server, provided that their connectivity to data resources is sustained. Using virtual servers facilitates migrating data discovery and data management tasks during failover. The virtual IP address, that is part of a virtual server, does not connect a physical server to a data source. It connects services running on a particular physical server to a data source. Another advantage of virtual servers is that more than one virtual server running in a node provides parallel processing which increases performance.

Each node can have multiple network ports, also called physical IP ports. Node 111 has physical ports P11, P12, ..., P1K. Node 112 has physical ports P21. P22, ..., P2K. Node 113 has physical ports P31, P32, P3K. Link 118 connects P11 to network 140, link 119 connects P12 to network 140, and link 11K connects P1K to network 140. Link 121 connects P21 to network 140, link 122 connects P22 to the network 140, and link 12K connects P2K to network 140. Link 131 connects P31 to network 140, link 132 connects P32 to the network 140, and link 13K connects P3K to network 140. If a physical port fails, the node will recover as long as there are healthy physical ports on the node. Failure of the last port on a node causes failover to a healthy node. As an example, assume that, in node 111, virtual address V11 is attached to the physical network port P11. When P11 fails, V11 is moved to P12. If P12 fails, V11 is moved to the next port. This is repeated until V11 resides on the last port V1K. If P1K fails, node failover takes place and V11 moves to a physical port on another node.

A node in the cluster can act as either a master or a slave. There is only one master; the rest of the nodes are slaves. The master contains a database 117. All nodes can access the database 117. The master coordinates the activities of the slaves and assigns data management jobs to them. Data management jobs include, but not limited to, data discovery, crawling, data categorization, and executing management policies. The slaves report the resources they control to the master. The slave servers are only aware of their own resources, workload and state. Slaves measure their CPU usage, memory usage, disk usage, the load on their network, and load on each of their virtual servers, and provide this information to the master. The master maintains state information for the entire cluster. Information about workload of nodes is used during load balancing. Load balancing is attained by moving virtual servers to the less loaded nodes.

Nodes access source data and perform data categorization based on metadata and full text search. Extracted metadata is stored in metadata repositories 114, 115 and 116. Search index is stored in repositories 151, 152 and 153. Nodes apply policies to each category of data and the results are stored in database 117.

In the cluster, a heartbeat protocol that operates over the network connection between nodes determines the availability of each server. A node knows about the failure of another node when it stops receiving heartbeat messages. Heartbeat over the network connection is based on the master probing the slaves using pings and/or RPC (Remote Procedure Call) calls. Pings can be implemented on either private or public networks.

If the master does not receive a response from a slave within a specified time, then the slave cannot be reached or there may be other problems with the slave. The specified time is adjustable, and usually it is set to 3 seconds. If the master stops sending pings or RPC, the slaves assume that the master could not be reached or that there may be other problems with the master. If the master failed, the priority at which one of the slaves becomes a master depends on when it joined the cluster. The cluster keeps a record of the order in which the slaves joined the cluster. The first slave that joined the cluster is the one that will become the second master if the first master failed. If the second master failed, the second slave that joined the cluster will become the third master. The process is repeated whenever a master failed.

Figure 2:
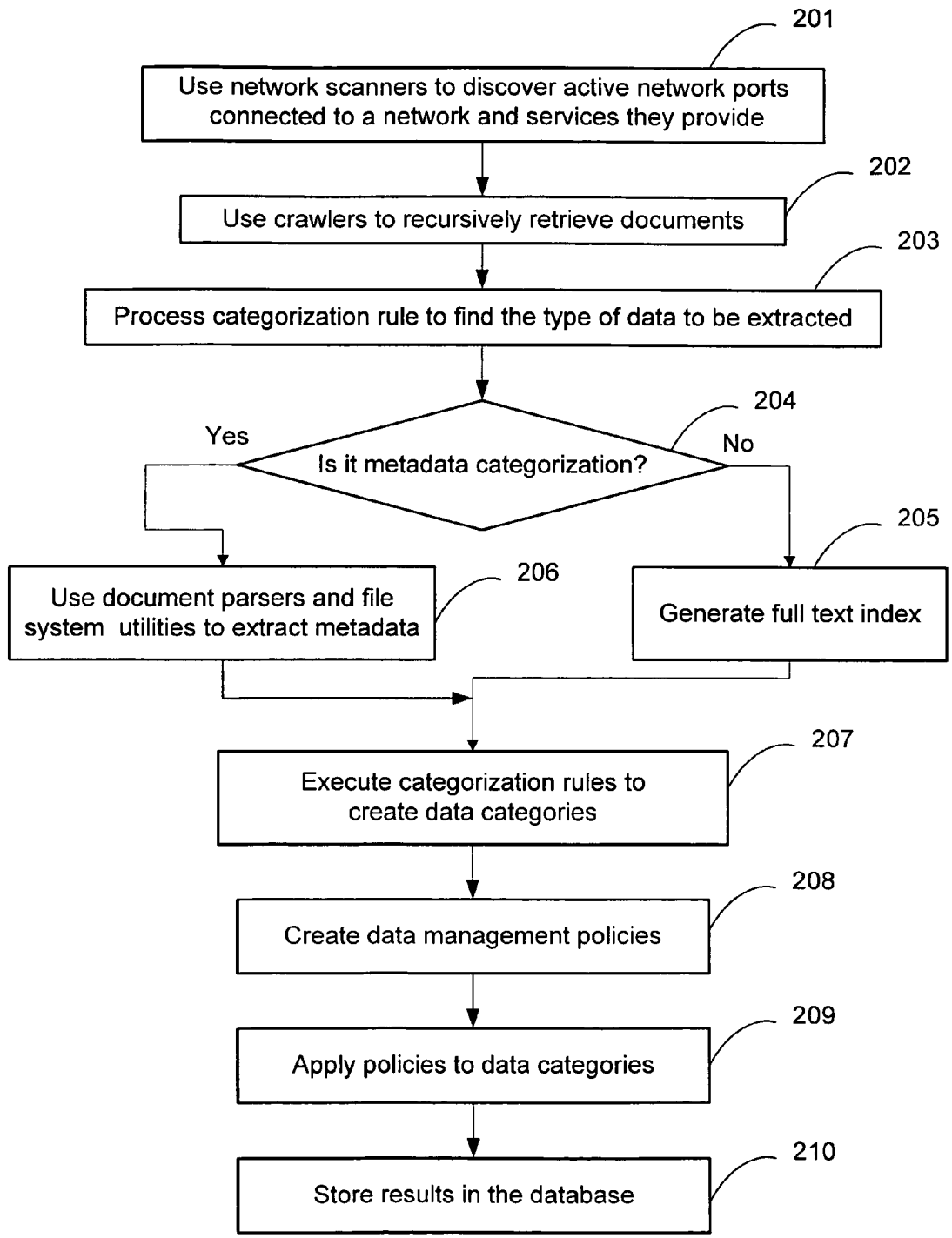
FIG. 2 is a flowchart illustrating steps executed during data management.

FIG. 2 illustrates the steps for one implementation of data management. In step 201 nodes use network scanners to discover active network ports connected to a network and services they provide. This is referred to as data discovery. Results returned by scanners indicate locations where data is stored. In step 202, nodes access the locations where data is stored and use crawlers to recursively retrieve documents. In step 203, nodes process categorization rule to find the type of data to be extracted. In the decision step 204 the node determines whether the categorization rule is based on metadata. If it is based on metadata, step 206 is performed. Here, document parsers and file system utilities are used to extract metadata. If the categorization rule is not based on metadata, step 205 is performed. Here a search engine is used to generate a full text index. In step 207 the categorization rule is executed to create categories of data. In step 208 data management policies for different data categories are created. In step 209 policies are applied to data categories. Executing policies results in actions applied to the target data category. In step 210 data management results are stored in the database. The flowchart shows that policies are created after data is categorized. As there is no dependency between the two, practically, policies could be created earlier.

Data discovery is an automated process to discover all devices in a network, or could be restricted to specific devices like network file servers, mail servers, intranets, database servers or archives. Discovery could also be based on a host name, host IP address, range of IP addresses or a subnet. (A subnet is a portion of a network that shares a common address component by providing the IP address with the same prefix.) After data is discovered a user can select whether to categorize all discovered data or a sub-set of the data. The system allows the user to enter the location of the data source manually, instead of using auto-discovery.

Figure 3:
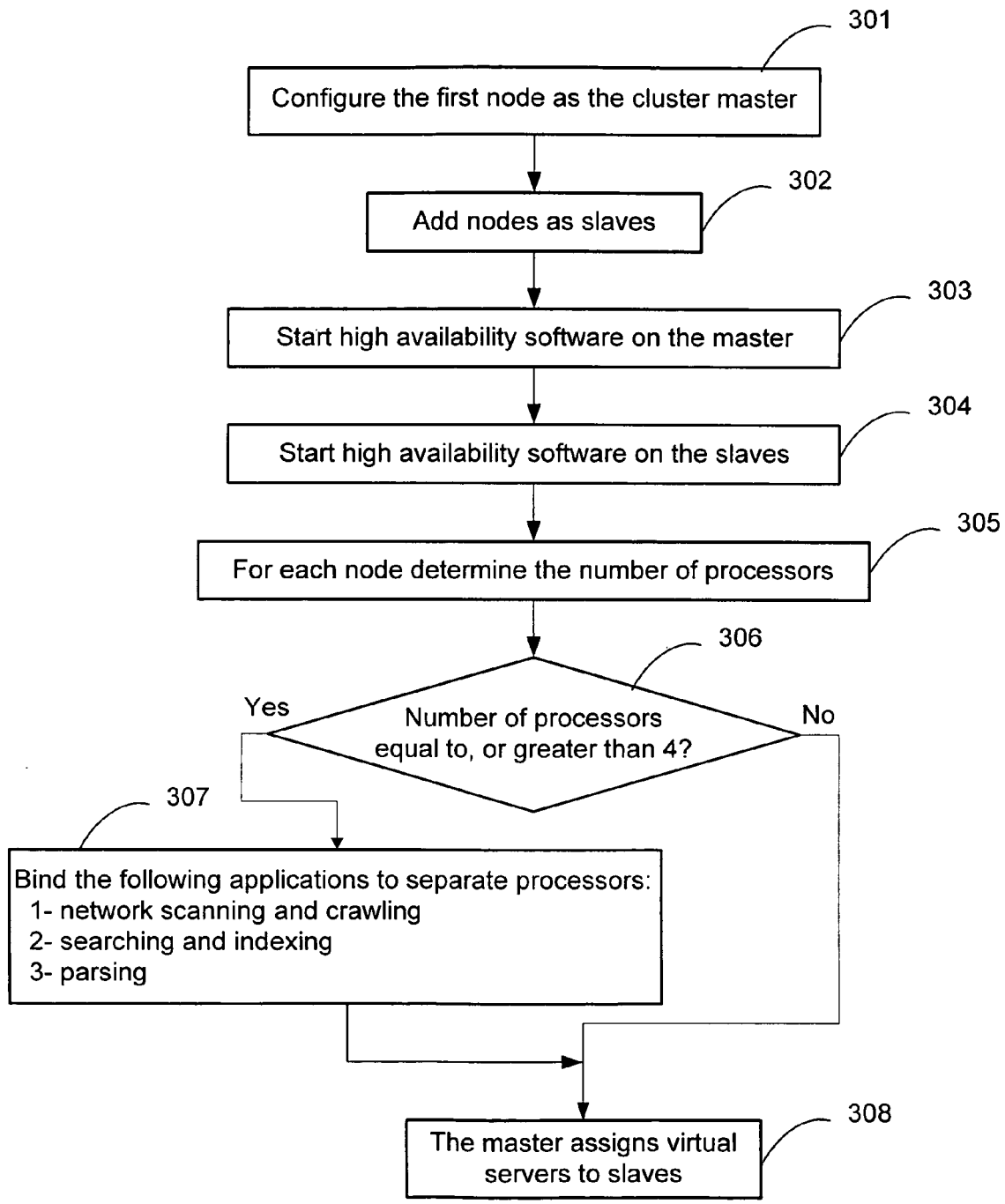
FIG. 3 is a flowchart illustrating initialization of a high availability cluster.

FIG. 3 illustrates the initialization of the cluster system in accordance with the invention. In step 301 the first node is configured as the cluster master. In step 302, nodes are added to the cluster as slaves. In step 303, high availability software is started on the master. In step 304 the high availability software is started on the slave nodes. In step 305 the number of processors on each node is determined. Based on the number of processors, the node decides whether to bind major software applications to different processors. This is done to increase performance. The decision step 306 checks whether the number of processors is equal to or greater than 4. If the number of processors is equal to or greater than 4, then in step 307 bind IP network scanning and crawling to a first processor, searching and indexing to a second processor and parsing to a third processor. The remaining processors are available for operating system, other applications and software components. The binding is not exclusive. The three processors to which the applications are bound are free to execute other tasks as well. Binding applications to processors is optional. It is a configurable parameter that can be controlled through an administration interface to the system. In step 308 the master assigns virtual servers to the slaves.

Figure 4A:
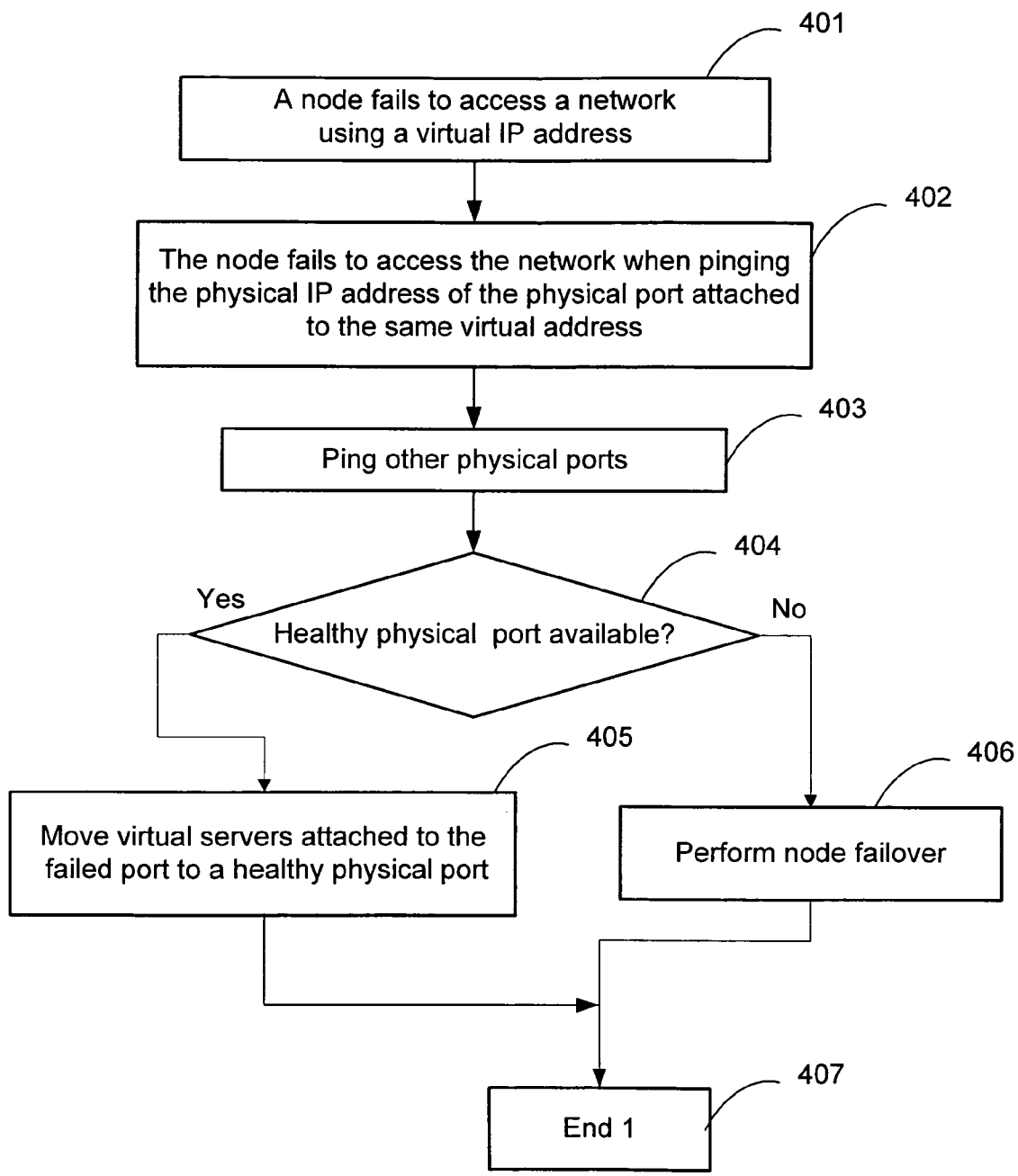
FIG. 4A is a flowchart illustrating network failover.

FIG. 4A illustrates the network failover. In step 401, a node fails to access a network using a virtual IP address. In step 402, the node fails to access the network when pinging the physical IP address of the physical port attached to the same virtual address. In step 403, the node pings other physical ports. The decision step 404 finds out whether there is a healthy physical port. If there is a healthy physical port, then in step 405, the virtual servers attached to the failed port are moved to a healthy physical port. If there is no healthy physical port the node is considered as a failed node, and in step 406, node failover takes place. In a node failover, all the virtual servers are moved to another healthy node. Step 407, marks the end of network failover.

Figure 4B:
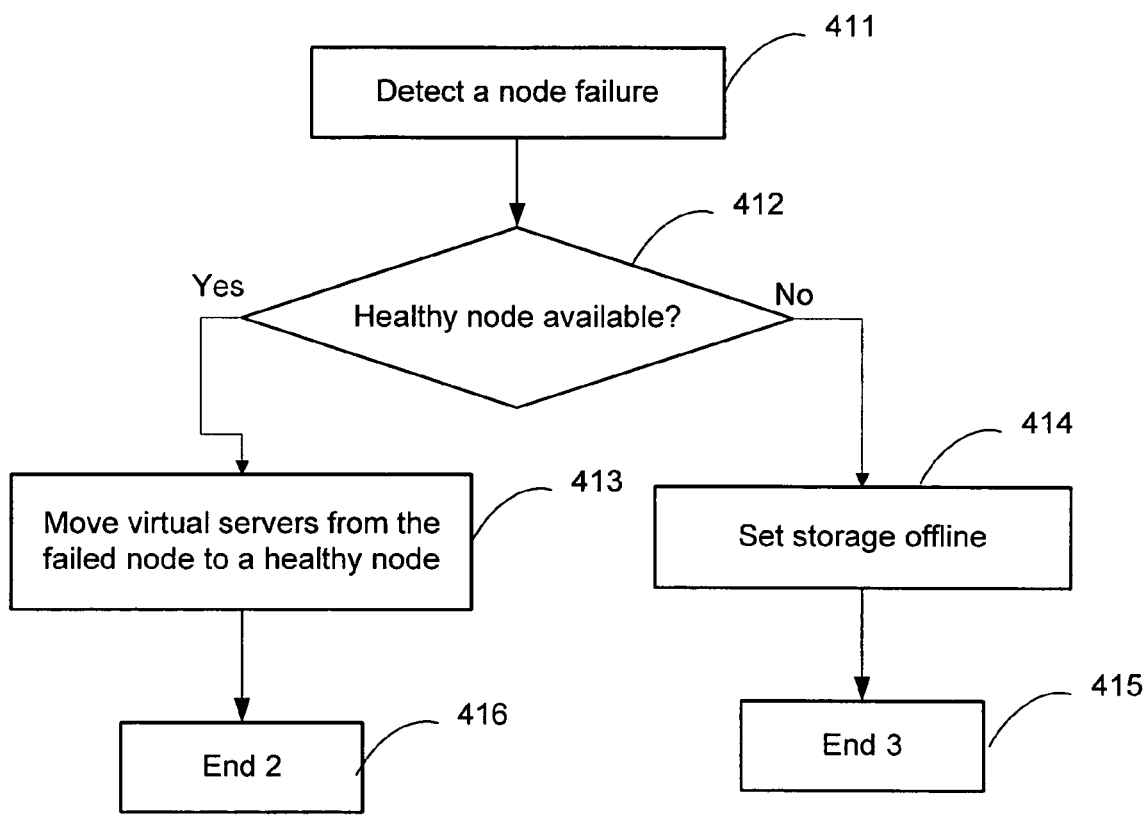
FIG. 4B is a flowchart illustrating node failover.

FIG. 4B illustrates node failover. In step 411a node failure is detected. Decision step 412 finds out whether there is a healthy node or not. If there is a healthy node, then in 413, node failover takes place. Here, virtual servers are moved from the failed node to the healthy node. This branch of the flowchart ends at step 416. If there is no healthy node, then in step 414, storage is set offline to protect stored data from corruption. Making the system operational requires the intervention of a system administrator or a user. This branch of the flowchart ends at step 415.

Figure 5:
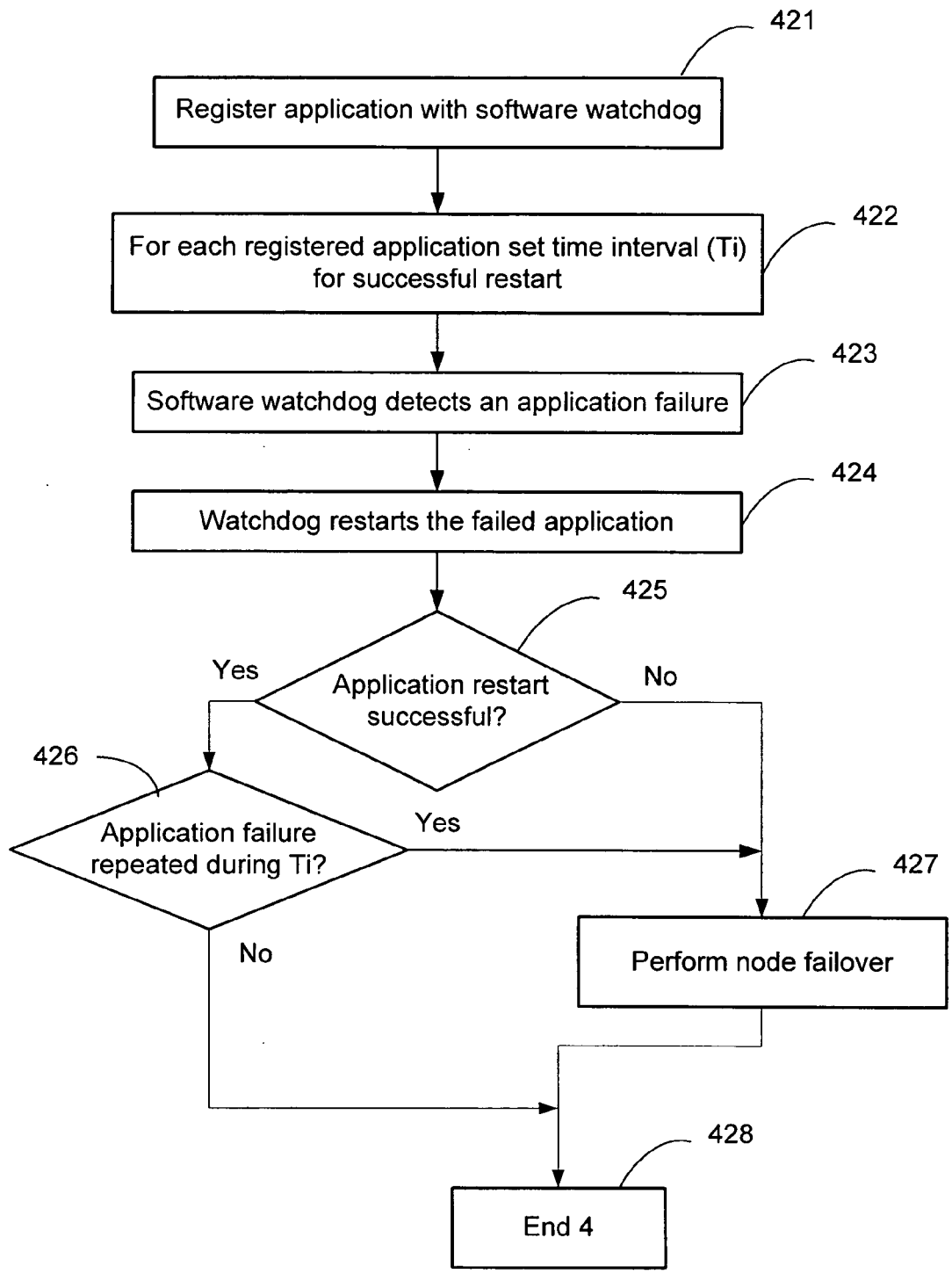
FIG. 5 is a flowchart illustrating application recovery.

FIG. 5 illustrates data management application recovery. A data management application is run as a software process. In step 421, a data management application that needs to be restarted, when it fails, is registered with a software watchdog. A software watchdog watches the activities of the registered applications by periodically sending messages to them. When an application is registered the software watchdog associates a time interval Ti with the application and sets it to a specific value (step 422). The value depends on the application and is configurable. If a restarted application failed during that time interval, the watchdog software will not restart it again. This is done to avoid ping-ponging, in which an application restarts and fails continuously. In step 423 the watchdog software detects an application failure. In step 424 the watchdog software restarts the failed application. The decision step 425 verifies that the restart is successful. If it is not successful, the failure is considered a node failure and node failover takes place (step 427). If the restart is successful, decision step 426 verifies that the application failure is not repeated during time interval Ti. If it is repeated, node failover takes place (step 427). Step 428, marks the end of the flowchart.

FIG. 6 illustrates resources owned by a virtual server. Each virtual server has its virtual IP address, a physical IP address to which the virtual IP address is attached, physical IP addresses it can failover to, categorization rules, search operations, access to data sources managed by the virtual server, access to index data repositories on the local and other nodes, access to metadata repositories on the local and other nodes, access to the cluster database, categorization operations, creation and execution of policies and scheduled data management jobs. The scheduled data management jobs are assigned by the master. A job could be one or a collection of assignments. An assignment includes, but not limited to, scanning a network, crawling, categorizing data, searching data, executing policies, or generating reports. A job execution could be scheduled to be done immediately or at a later time and date.

Figure 7:
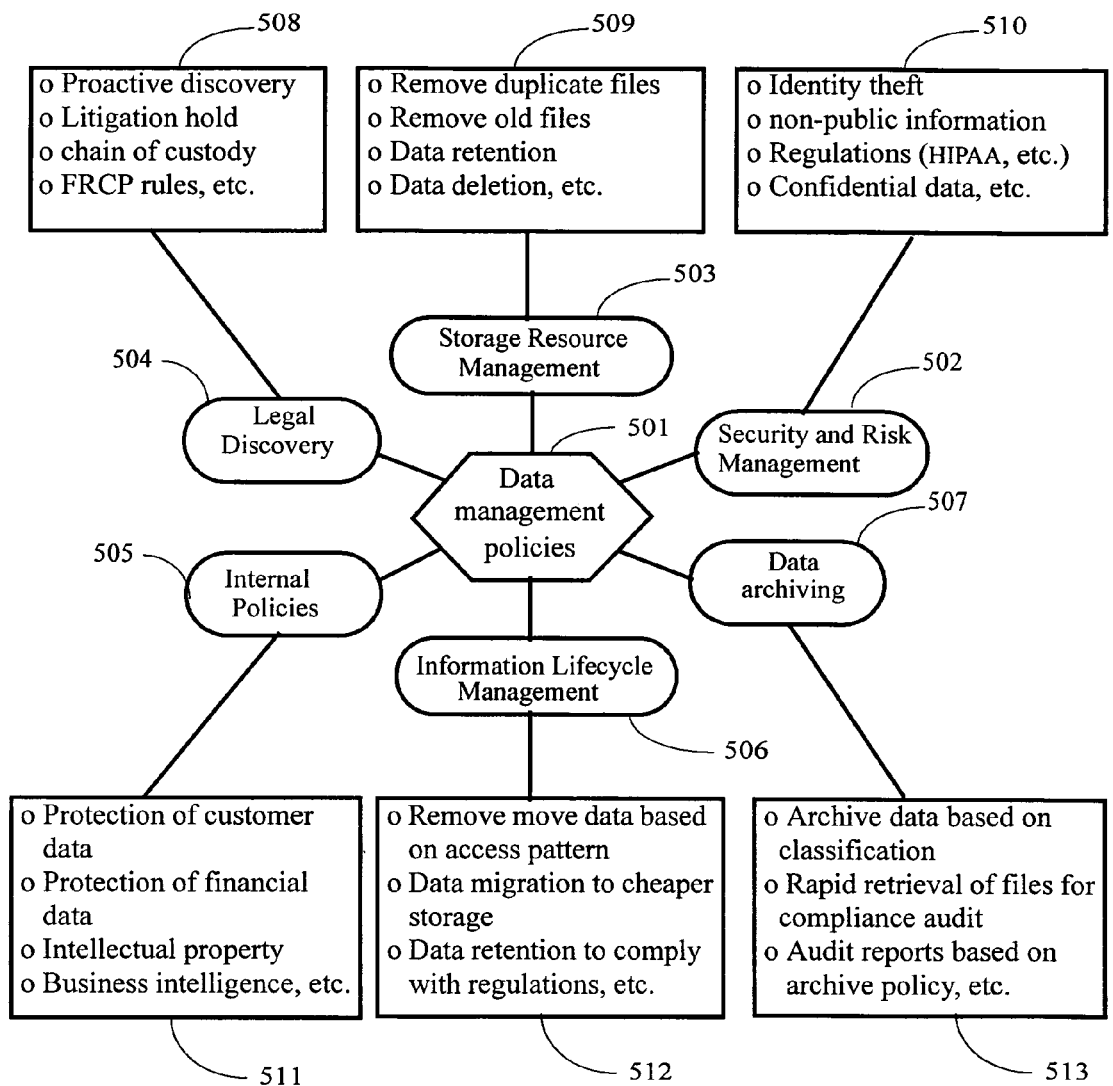
FIG. 7 illustrates the relationship between different management policies.

FIG. 7 illustrates the data management policies provided by the invention. Data management policies (501), includes six types of policies: Security and Risk Management 502, Storage Resource Management 503, Legal Discovery 504, company's internal policies 505, Information Lifecycle Management 506 and data archiving 507. Each of the six policies consists of sub-policies. For instance, the Security and Risk Management policy (502) includes policies to deal with, but not limited to: identity theft, non-public information, federal regulations and confidential data. List 510 shows a sample of policies that are part of Security and Risk Management. Lists of sample policies that are part of Storage Resource Management, Legal Discovery, Internal policies, Information Lifecycle Management and data archiving are shown in 509, 508, 511, 512 and 513 respectively. There may exist conflicting policy actions. Legal discovery may require litigation hold on the same data that SRM marks for deletion because no one has accessed that data for a long time. Some of the policies could be similar but have different actions. For instance, HIPAA may require longer data retention than the retention required by Storage Resource Management. To resolve such issues the invention provides methods for breaking policies into policy entities. The policy entities are grouped to form higher-level management policies. The invention provides means for giving higher priority to federal regulations. An entity included in a federal regulation policy has a higher priority than an entity that belongs to other policies. When a policy entity is part of two different federal regulations that mandate two different enforcement periods, the entity with the longer period is selected.

FIG. 8 shows generic policy entities provided by the invention and their corresponding policy actions. Generic policy entities could be members of different policy groups. An action in a policy entity can have different options. For instance, for data retention policy entity, data could be retained for one month or five years. A policy entity can have different actions and could be a member of different policy groups. In FIG. 8, the first three policy entities "data access", "read permission", and "write permission" have two actions "allow" or "deny". The actions for data retention are: retain data until a specific date or retain it for a period of time. Concerning data deletion entity, there are two methods to delete data. The first method is deleting a file or a record using file system utilities. This is not safe as remnant data related to the file may still exist in the storage medium and could be recovered. The second method is wiping or shredding a file by overwriting the storage medium with new data. This removes all data from the disk. An action for encryption policy is based on using one of the encryption solutions: Advanced Encryption Standard (AES), Twofish, Blowfish or Serpent. SSN, credit card number and bank account entities have six actions. The actions on the data that contains one of them is: send security alert to an administrator, deny access to the data, delete the data after archiving it, move the data to a secure store, remove the data or apply a company policy. A company policy could be based on allowing only authorized employees to access the data. Audit policy has three groups of actions. The first group is audit data access, data modification, data deletion, change owner, change permissions and document creation date. The second group is related to regulatory compliance auditing which has additional requirements. For instance, Sarbanes-Oxley auditing requires companies to pay detailed attention to privileged users who changed a record, who deleted a record and changed a data schema. The third group includes actions related to archive policy. Here, the actions are: record when a document was archived, who archived it, document restoration date and who restored it. The policy entity WORM has one action. The action is to deny write and deny modifications to metadata and schema. The policy entities delete stale files, delete duplicate files, and delete contraband files have one action, which is deleting the files. The action for the policy entity lock and isolate is to store data in a secure place or in an archive. The policy entity replicate has two actions: replicate in one place and replicate in multiple places.

Figure 9:
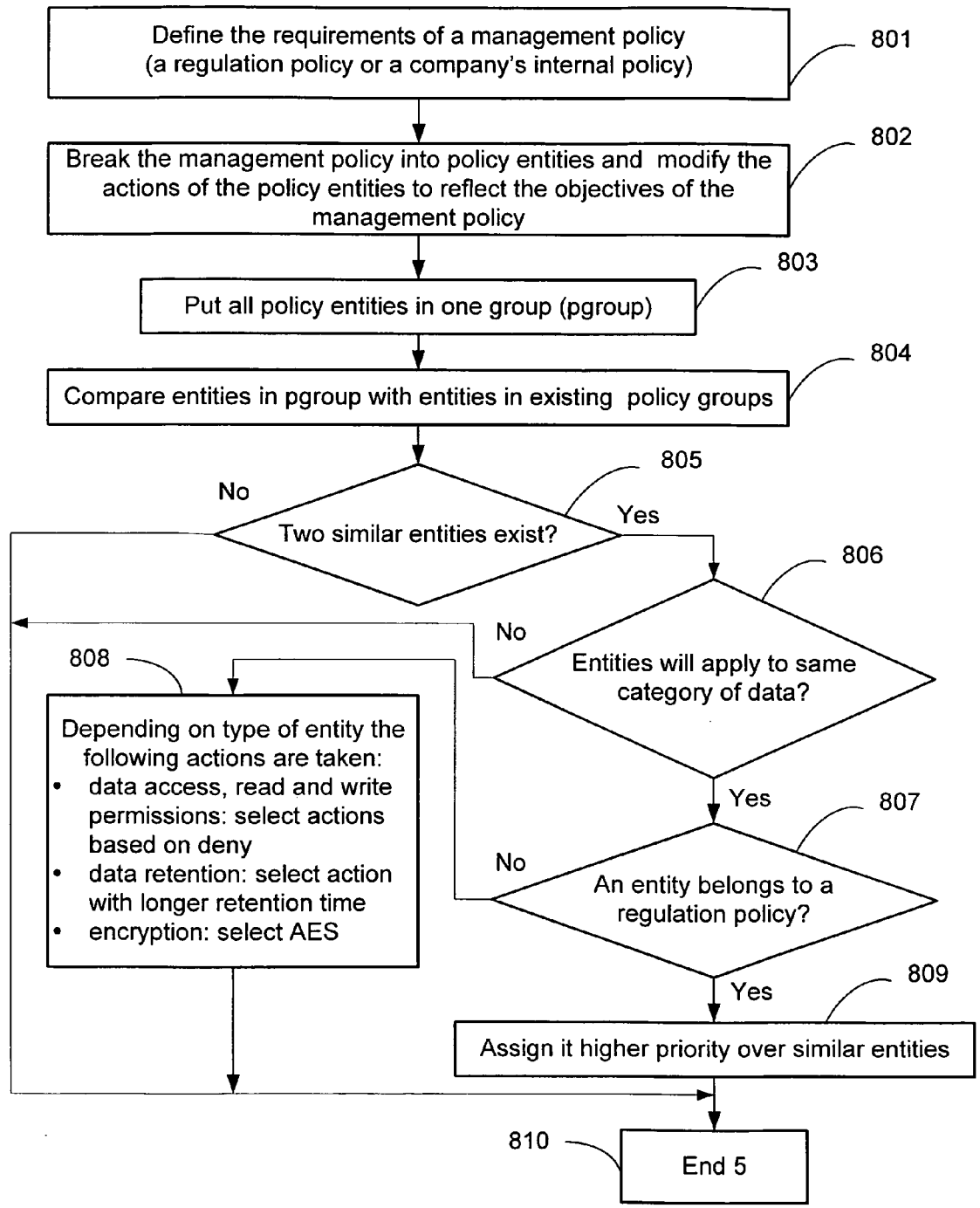
FIG. 9 is a flowchart illustrating the creation of policy groups.

FIG. 9 illustrates how a policy group is formed. In step 801, the requirements of a management policy is defined. The management policy could be a regulatory policy or an internal company's policy. In step 802, the management policy is broken into policy entities and the actions of the policy entities are modified to reflect the objectives of the management policy. In step 803, all policy entities are placed in one group referred to as pgroup. In step 804, entities in pgroup are compared with entities in existing policy groups. Decision step 805, verifies whether two similar policy entities exist. If two entities are similar, then decision step 806 verifies whether the policy entities will apply to the same data category. If the policy entities will apply to the same data category, decision step 807 verifies whether one of the entities belongs to a federal regulation policy. If a policy entity belongs to a regulation policy, it is assigned higher priority and its actions will be applied (step 809). In decision step 805, if there are no similar entities, processing of entities within a group ends (step 810). In decision step 806, if policy entities do not act on the same data category, processing of entities within a group ends (step 810). In decision step 807 if neither policy entity belongs to a federal regulation policy, then the solution depends on the type of the entity (step 808). If the entity is data access, data read or data write permissions, the action deny is selected. Deny is usually imposed because of security concerns, so it has higher priority than allow. If the policy entity is data retention, then the action with longer retention period is selected. If the entity type is encryption, AES encryption method is selected due to its adoption by the U.S. government as an encryption standard. If after executing steps 808 and 809, all policy entities are covered, then this flowchart ends at 810.

In another embodiment of the invention, instead of DAS storage, SAN storage is used. SAN allows sharing of storage and simplifies storage management. SAN also tends to enable more effective disaster recovery processes as it spans a distant location containing a secondary storage array. Using SAN, nodes could be located in different buildings separated by a few miles. If disaster in a building caused nodes in that building to fail, virtual servers are migrated from the failed nodes to healthy nodes in other buildings.

In another embodiment of the invention, some nodes, within the same cluster, use DAS storage and some use SAN storage.

According to another implementation of the invention a distributed database is used to replace the database connected to the master. In this implementation more than two nodes in a cluster have homogeneous databases. Databases in different nodes form a single distributed database, in which an application in any node can access or modify the databases in different nodes in the cluster.

CONCLUSION, RAMIFICATION, AND SCOPE

Accordingly, the reader will see that the present invention provides a high availability and scalable system that manages different aspects of enterprise data in one platform. It automatically scans and finds data in all devices connected to a network, including laptops and devices at remote sites. It manages different types of data stored in: file systems, databases, emails servers, intranets, and archives. The system adopts a unified approach, based on policy entities to build diversified enterprise and regulatory compliance policies.

While the above description contain several specifics these should not be construed as limitations on the scope of the invention, but rather as examples of the some of the preferred embodiments, thereof. Many other variations are possible. For example, other embodiments of the system could have external storage for metadata and search index repositories, instead of using storage attached to the nodes. The distributed database for storing results of data management could be based on heterogeneous databases instead of homogeneous databases.

The invention has been described in terms of particular embodiments. Other embodiments are within the scope of the following claims. For example, steps of the invention can be performed to a different order and still achieve desirable results.

What is claimed is:

1. An enterprise data management system, comprising:
two or more nodes connected to a network, each of said nodes including:
　at least one processor;
　one or more network ports; and
　Directly Attached Storage (DAS) storing computer programs for operating such systems, and for storing intermediate and final results of enterprise data management;
wherein each of said nodes:
　connects to data sources over said network;
　is configured to:
　　run one or more virtual servers, each said virtual server including:
　　　a virtual interface to said data sources, wherein said virtual interface includes one or more virtual IP addresses, and wherein each said virtual IP address is mapped to a physical IP address;
　　　means to discover said data sources and retrieve content of said data sources;
　　　means to extract metadata from the content of said data sources;
　　　means to create a search index of the content of said data sources;
　　　means to perform text search using said search index;
　　　means to use said metadata and said text search to classify the content of said data sources into different categories;
　　　means to create high level data management policies, each said high level management policy including policy entities, wherein each said policy entity includes one or more actions to be performed on data, wherein said actions:
　　　　modify data read/write and access permissions;
　　　　ensure data security;
　　　　ensure data protection; and
　　　　ensure data availability; and
　　　means to apply said high level data management policies to said categories;
　is configured to:
　　detect a failed network port in a first node said failed network port has no network connectivity;
　　determine whether there is a good network port on said first node, said good network port has network connectivity;
　　move virtual servers attached to said failed network port to a good network port on said first node if there is such a good network port;
　　move virtual servers attached to said failed network port to a second node if there is no such good network port on said first node; and
　　detect failure of a first node and move all virtual servers owned by said first node to a second healthy node in the system.

2. The system of claim of 1, further comprising:
a master node, wherein the master node includes:
    a database for storing results of data management;
    a metadata repository; and
    a search index repository; and
slave nodes, wherein each of said slave nodes includes:
    a metadata repository; and
    a search index repository.

3. The system of claim 1, further comprising:
means for auditing the content of said data sources.

* * * * *